(12) United States Patent
Zou et al.

(10) Patent No.: US 9,710,155 B2
(45) Date of Patent: Jul. 18, 2017

(54) USER INTERFACE

(75) Inventors: Yanming Zou, Beijing (CN); Yingfei Liu, Beijing (CN); Yongguang Guo, Beijing (CN); Kongqiao Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 348 days.

(21) Appl. No.: 13/991,801

(22) PCT Filed: Dec. 8, 2010

(86) PCT No.: PCT/CN2010/079562
§ 371 (c)(1),
(2), (4) Date: Jul. 23, 2013

(87) PCT Pub. No.: WO2012/075629
PCT Pub. Date: Jun. 14, 2012

(65) Prior Publication Data
US 2014/0173531 A1    Jun. 19, 2014

(51) Int. Cl.
*G06F 3/0481* (2013.01)
*G06F 3/0488* (2013.01)
*G06F 3/041* (2006.01)

(52) U.S. Cl.
CPC ........ *G06F 3/04883* (2013.01); *G06F 3/0418* (2013.01)

(58) Field of Classification Search
CPC ... G06F 3/0481; G06F 3/04883; G06F 3/0488
See application file for complete search history.

(56) References Cited

U.S. PATENT DOCUMENTS

| | | | | |
|---|---|---|---|---|
| 5,392,058 A | * | 2/1995 | Tagawa | 345/104 |
| 5,491,305 A | * | 2/1996 | Kawakami et al. | 178/18.04 |
| 5,578,813 A | * | 11/1996 | Allen | H04N 1/047 |
| | | | | 235/462.42 |
| 5,684,277 A | * | 11/1997 | Tokioka et al. | 178/18.04 |
| 5,798,758 A | * | 8/1998 | Harada et al. | 715/863 |

(Continued)

FOREIGN PATENT DOCUMENTS

| | | |
|---|---|---|
| CN | 1926496 A | 3/2007 |
| CN | 101128792 A | 2/2008 |

(Continued)

OTHER PUBLICATIONS

International Search Report and Written Opinion received for corresponding Patent Cooperation Treaty Application No. PCT/CN2010/079562 , dated Sep. 22, 2011, 11 pages.

(Continued)

*Primary Examiner* — Phenuel Salomon
(74) *Attorney, Agent, or Firm* — Alston & Bird LLP (57) ABSTRACT

User input data and movement data relating to movement of a device to which the user input is made is monitored. The input data may be modified according to the movement data so that inadvertent inputs based on an unwanted tremors, bumps, or similar are accounted for. Data from an accelerometer may indicate sudden movement or bumps. The input data, such as handwriting for example, may then be modified based on the data from the accelerometer. Therefore, the device may determine the input as intended by the user.

15 Claims, 5 Drawing Sheets

(56) References Cited

U.S. PATENT DOCUMENTS

| | | | |
|---|---|---|---|
| 6,104,969 A * | 8/2000 | Beeks | G01C 23/00 345/157 |
| 6,256,016 B1 * | 7/2001 | Piot | G06F 3/0317 250/208.2 |
| 6,278,445 B1 * | 8/2001 | Tanaka et al. | 345/178 |
| 6,329,991 B1 * | 12/2001 | Fukuda et al. | 345/629 |
| 7,342,575 B1 * | 3/2008 | Hartwell | G06F 3/03545 178/19.05 |
| 7,634,136 B2 * | 12/2009 | Kawamoto et al. | 382/187 |
| 2003/0103037 A1 * | 6/2003 | Rotzoll | G06F 3/0317 345/157 |
| 2003/0132943 A1 * | 7/2003 | Guleryuz | H04N 1/40068 345/581 |
| 2004/0036681 A1 * | 2/2004 | Kluttz et al. | 345/173 |
| 2005/0166163 A1 * | 7/2005 | Chang | G06F 3/017 715/863 |
| 2005/0174324 A1 * | 8/2005 | Liberty | G06F 3/017 345/156 |
| 2005/0190059 A1 * | 9/2005 | Wehrenberg | 340/571 |
| 2005/0249387 A1 * | 11/2005 | Machida | G06K 9/00335 382/124 |
| 2006/0244738 A1 * | 11/2006 | Nishimura | G06F 3/0317 345/179 |
| 2007/0140526 A1 * | 6/2007 | Pirim | G06T 7/2033 382/103 |
| 2007/0216641 A1 | 9/2007 | Young et al. | |
| 2008/0005703 A1 * | 1/2008 | Radivojevic et al. | 715/863 |
| 2009/0125224 A1 | 5/2009 | Basche et al. | |
| 2010/0303384 A1 * | 12/2010 | Knee | G06T 3/4023 382/298 |
| 2011/0043456 A1 * | 2/2011 | Rubinstein | G06F 3/0485 345/173 |
| 2011/0286731 A1 * | 11/2011 | Gallagher | G03B 17/00 396/53 |
| 2011/0312279 A1 * | 12/2011 | Tsai | G01S 11/02 455/67.11 |
| 2012/0062387 A1 * | 3/2012 | Vik | G06F 3/0487 340/665 |
| 2014/0289653 A1 * | 9/2014 | Chen | G06F 3/04845 715/763 |

FOREIGN PATENT DOCUMENTS

| | | |
|---|---|---|
| CN | 101308414 A | 11/2008 |
| CN | 101625844 A | 1/2010 |
| CN | 101807130 A | 8/2010 |
| CN | 101833390 A | 9/2010 |
| CN | 101833411 A | 9/2010 |
| WO | WO 2005/093550 A2 | 10/2005 |
| WO | WO 2011/025578 A1 | 3/2011 |

OTHER PUBLICATIONS

Office Action for corresponding Chinese Application No. 201080071183.6 dated Aug. 19, 2015.

Extended European Search Report for corresponding European Office Action No. 10860494.3, dated Jul. 25, 2016, 9 pages.

Office Action for corresponding Chinese Application No. 201080071183.6 dated Jun. 12, 2016.

Office Action for corresponding Chinese Patent Application No. 201080071183.6, dated Mar. 13, 2017, with English language summary, 5 pages.

* cited by examiner

FIG. 5

USER INTERFACE

RELATED APPLICATION

This application was originally filed as Patent Cooperation Treaty Application No. PCT/CN2010/079562 filed Dec. 8, 2010.

TECHNICAL FIELD

The present application relates generally to a user interface and especially to a trace input entered on a surface.

BACKGROUND

A trace input entered on a surface may be used for entering, for example, data or a command into an electronic device. Often trace inputs are entered by using a stylus, a special pen or a finger. The entered trace may then be interpreted by the electronic device to execute an entered command, for example. Some examples of utilising a trace input may include using an entered trace as a search parameter, as a command to launch an application or as input data in terms of inputting handwriting in an electronic device.

SUMMARY

Various aspects of examples of the invention are set out in the claims.

According to a first aspect of the present invention, there is provided a method comprising receiving a trace input entered on a surface, receiving movement data describing the movement of the surface during entry of the trace input and modifying the trace input based on the movement data.

According to a second aspect of the present invention, there is provided an apparatus comprising a processor, memory including computer program code, the memory and the computer program code configured to, working with the processor, cause the apparatus to perform at least the following: to receive a trace input entered on a surface, to receive movement data describing the movement of the surface during entry of the trace input and to modify the trace input based on the movement data.

According to a third aspect of the present invention, there is provided a computer program product comprising a computer-readable medium bearing computer program code embodied therein for use with a computer, the computer program code comprising code for receiving a trace input entered on a surface, code for receiving movement data describing the movement of the surface during entry of the trace input and code for modifying the trace input based on the movement data.

According to a fourth aspect of the present invention there is provided an apparatus, comprising means for receiving a trace input entered on a surface, means for receiving movement data describing the movement of the surface during entry of the trace input and means for modifying the trace input based on the movement data.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

The aspects of the disclosed embodiments relate to user operations on an apparatus. In particular, some examples relate to inputting data and/or instructions to an electronic device. In some example embodiments data and/or instructions are received by an entered trace input on a surface. In some example embodiments the upper operation relates to an entered trace input on a surface, with the trace input having another significance. In some examples the trace input is modified by movement data describing the movement of the surface. In some examples the trace input is modified during the trace input. In some example embodiments the trace input is used for handwriting recognition. In some examples the trace input is compensated based on the movement data.

Figure 1:
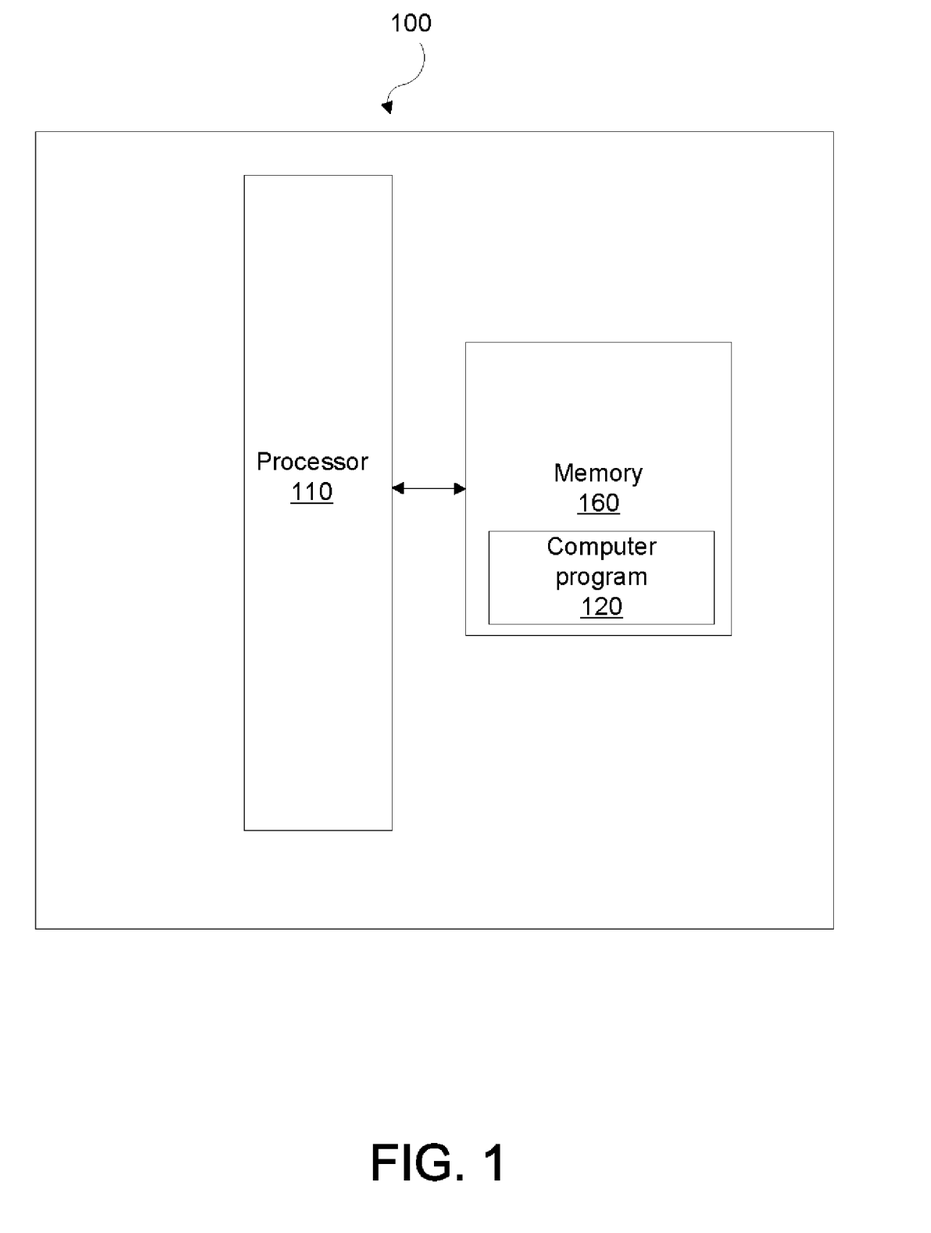
FIG. 1 shows a block diagram of an example apparatus in which aspects of the disclosed embodiments may be applied.

FIG. 1 is a block diagram depicting an apparatus 100 operating in accordance with an example embodiment of the invention. The apparatus 100 may, for example, be an electronic device such as a chip or a chip-set. Generally, the apparatus 100 includes a processor 110 and a memory 160. In another example embodiment the apparatus 100 may comprise multiple processors.

In the example of FIG. 1, the processor 110 is a control unit that is operatively connected to read from and write to the memory 160. The processor 110 may also be configured to receive control signals to the processor 110 received via an input interface and/or the processor 110 may be configured to output control signals by the processor 110 via an output interface.

The memory 160 stores computer program instructions 120 which when loaded into the processor 110 control the operation of the apparatus 100 as explained below. In another example embodiment the apparatus 100 may comprise more than one memory 160 or different kinds of storage devices.

In some example embodiments the processor 110 may be configured to convert the received control signals into appropriate commands for controlling functionalities of the apparatus. In some example embodiments the apparatus may comprise more than one processor.

Computer program instructions 120 for enabling implementations of example embodiments of the invention or a part of such computer program instructions may be downloaded from a data storage unit to the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disc (DVD), or a Blu-ray disk.

Figure 2:
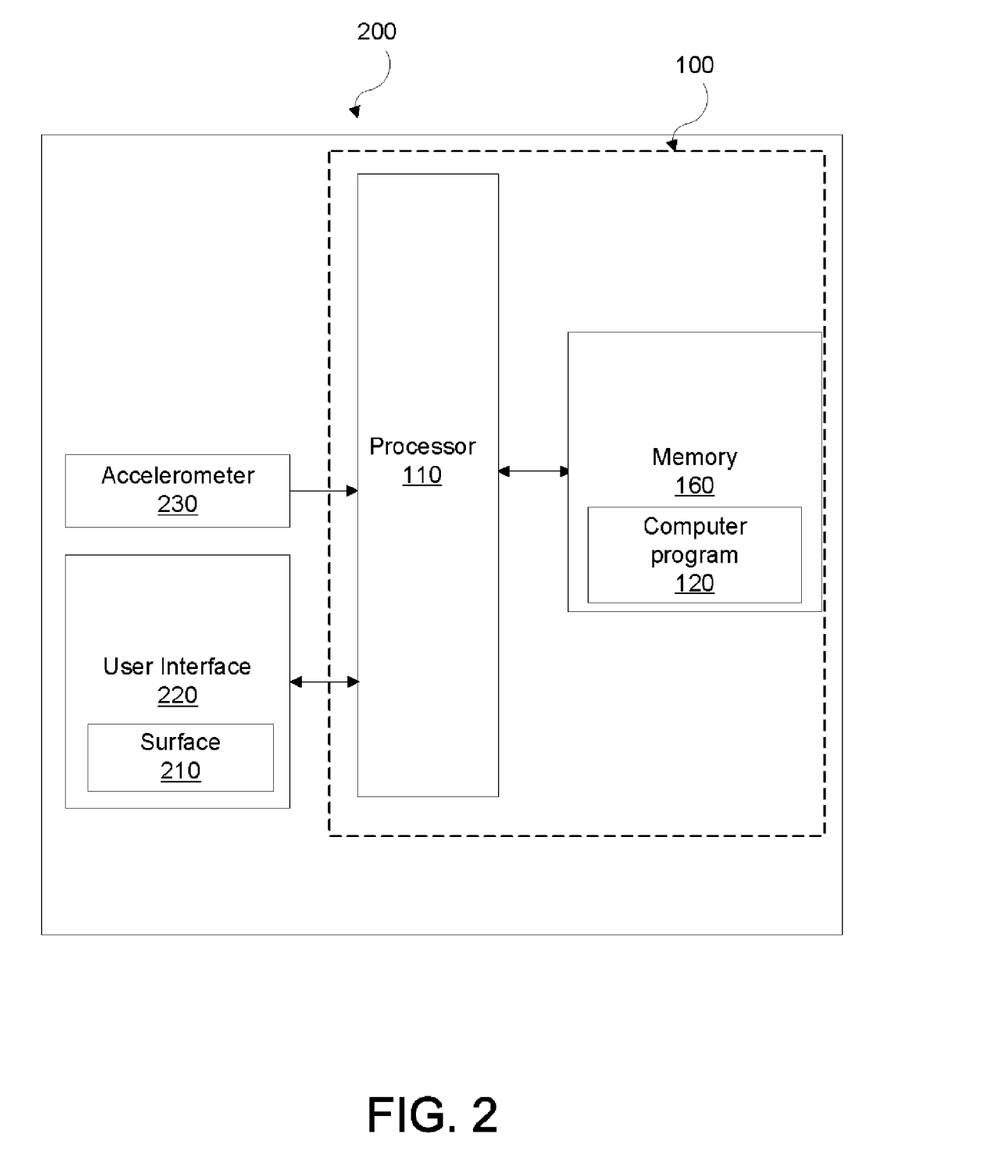
FIG. 2 shows a block diagram of another example apparatus in which aspects of the disclosed embodiments may be applied.

FIG. 2 is a block diagram depicting a further apparatus 200 operating in accordance with an example embodiment of the invention. The apparatus 200 may be an electronic device such as a hand-portable device, a mobile phone or a Personal Digital Assistant (PDA), a Personal Computer (PC), a laptop, a desktop, a wireless terminal, a communication terminal, a game console, a music player, an electronic book reader (e-book reader), a positioning device, a CD- or DVD-player, or a media player.

In some examples, the apparatus 200 includes the apparatus 100, a user interface 220 and a movement sensor such as an accelerometer 230, or other suitable means for detecting movement of the apparatus 200. In some further examples the user interface 220 may include a display such as a touch screen display, or the apparatus 200 may be arranged to be operable with an external display, separate from the apparatus 200 itself.

In the example of FIG. 2 the user interface 220 comprises means for inputting and accessing information in the apparatus 200. In one example embodiment means for inputting and accessing information comprises a surface 210 capable of receiving user inputs. The surface may be an input surface such as a touch screen or a touch pad. In some example embodiments the apparatus 200 may include both a touch screen and a touch pad or multiple surfaces 210 capable of receiving user inputs. A touch screen may be used as means for not only accessing and/or inputting information but also for displaying user interface objects, while a touch pad may be used as means for accessing and/or inputting information and a separate display may be provided. In some example embodiments, no display is provided.

In other examples, an input surface 210 may be present, but not comprised by the apparatus 200. In such cases, the input surface 210 may be monitored by the apparatus. For example, the input surface may comprise a sheet of paper or other markable surface upon which a user can mark an input trace—for example using a pen or other writing/drawing implement. Such a surface could be monitored by the device using, for example, a camera to record the input trace.

A user may input and access information by using a suitable input means such as a pointing means, one or more fingers, a stylus or a digital pen.

In some examples inputting and accessing information is performed by touching the surface 210 such as the surface of a touch screen display or a touch pad. In another example embodiment proximity of an input means such as a finger or a stylus may be detected and inputting and accessing information may be performed without a direct contact with the surface 210. In a further example embodiment the surface may be configured to detect multiple at least partially simultaneous touches on the surface 210.

A touch screen and/or a touch pad may be based on several different technologies. For example, different touch screen/pad technologies include resistive, capacitive, surface acoustic wave (SAW), infrared, strain gauge, optical imaging, dispersive signal technology and acoustic pulse recognition touch screens/pads. A touch screen and/or a touch pad may also operate using a combination of these technologies.

Additionally or alternatively, the user interface 220 may also comprise a manually operable control such as a button, a key, a touch pad, a joystick, a stylus, a pen, a roller, a rocker or any suitable input means for inputting and/or accessing information.

Further examples include a microphone, a speech recognition system, eye movement recognition system, acceleration, tilt and/or movement based input system.

In the example of FIG. 2 the processor 110 is configured to receive a trace input entered on the surface 210.

The processor is also configured to receive movement data describing the movement of the surface 210 during entry of the trace input. The movement of the surface 210 may be detected by a movement sensor that is configured to measure the physical acceleration of an object. In the example of FIG. 2, the movement sensor comprises an accelerometer 230 that may be configured to sense, for example, orientation, acceleration, vibration, shock and/or falling. In addition, the accelerometer 230 may be based on different technologies. For example, the accelerometer may operate using capacitive, piezoelectric or—resistive, Hall effect, magnetoresistive, heat transfer, Micro-Electro Mechanical System (MEMS)—based technology or any other suitable technology which may include, for example, nanotechnology. The accelerometer 230 may also operate using a combination of these technologies. In some example embodiments different kinds of means may be used for transforming the output of the accelerometer 230 into a suitable form. These means may include, for example, logic, software, hardware and/or means for translating the output.

According to one example embodiment the accelerometer 230 is operatively connected to the apparatus 200. According to another example embodiment the accelerometer 230 is operatively connected to a surface 210. According to a further example embodiment the accelerometer is comprised by the apparatus 200. According to a yet further example embodiment the accelerometer is incorporated into a module comprising the surface 210, for example, a touch screen module. In some example embodiments movement of the entire apparatus 200 may be detected, while in some example embodiments movement of the 210 surface may be detected. In some examples the surface 210 is separate from, but operatively connected with the apparatus 200.

The example apparatus 200 of FIG. 2 may also include an output device. According to one embodiment the output device is a display for presenting visual information such as user interface objects for a user. The display is configured to receive control signals provided by the processor 110. However, it is also possible that the apparatus 200 does not include a display or the display is an external display, separate from the apparatus 200 itself. According to one example embodiment the display may be incorporated within the user interface 220.

Additionally or alternatively, the apparatus 200 may include an output device such as a tactile feedback system for presenting tactile and/or haptic information for a user. The tactile feedback system may be configured to receive control signals provided by the processor 110. The tactile feedback system may be configured to indicate a completed operation or to indicate selecting an operation, for example. In one embodiment a tactile feedback system may cause the apparatus 200 to vibrate in a certain way to inform a user of an activated and/or completed operation.

FIGS. 3a to 3d illustrate an example user interface incorporating aspects of the disclosed embodiments. An apparatus 200 comprises a surface 210 configured to receive user inputs. In this example the surface 210 is a touch screen display incorporated within the user interface 220, which allows inputting and accessing information via the touch screen display. The touch screen display may be configured to present graphical user interface objects. The example apparatus 200 of FIG. 3 may also comprise one or more keys and/or additional and/or other components.

In the example of FIGS. 3a to 3d the touch screen display comprises a dedicated trace input area 350 in which a user can input information by entering a trace by means of a pointing device such as a stylus, a digital pen or a finger.

In one example embodiment a trace input comprises a user input entered on the surface 210. A user input may comprise, for example, one or more individual touch points, one or more consecutive touch points, one or more parallel touch points, one or more touch points located within a specified distance from each other, and/or one or more user touch points in a specified areal, temporal and/or causal arrangement. For example, a user input may comprise a single touch point, a group of touch points interpreted as a single touch point, a line of consecutive touch points or more than one lines of consecutive points. In another example a trace input comprises a continuous input extending over at least part of the surface 210. In yet another example a trace comprises a line entered on the surface 210. In a further example a trace input comprises a touch gesture entered on the surface 210. In a yet further embodiment a trace input may form a part of an input character. In some embodiments entering a trace input may not require a physical touch with the touch screen display but the trace input may be detected in close proximity to the touch screen display.

The touch screen display may also comprise other input and/or output areas, user interface elements and/or other means for interacting with the apparatus 200. Interacting with the apparatus 200 may include, for example, inputting and/or accessing data in the apparatus 200. In the example of FIGS. 3a to 3d the touch screen display also comprises a discrete input area 360 that enables inputting, for example, characters or commands to launch an application by a touch gesture or selecting a graphical user interface element. In one example embodiment the discrete input area may comprise a virtual keyboard comprising alphanumeric characters, special characters and/or graphical user interface elements.

Figure 3A:
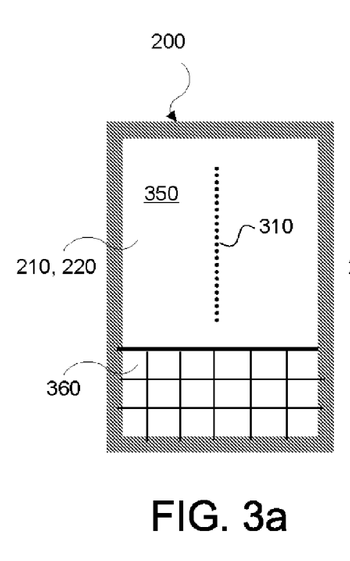
FIGS. 3a to 3d illustrate a user interface in accordance with an example embodiment of the invention.

In the example of FIG. 3a, a user wishes to input a trace on the touch screen as illustrated by the dotted line 310 in FIG. 3a. In this example the user wishes to input a straight line on the surface 210. The processor 110 is configured to receive a trace input entered on the surface 210. The trace 310 in the example of FIG. 3a is for illustrative purposes and it may not be visible to the user.

Figure 3B:
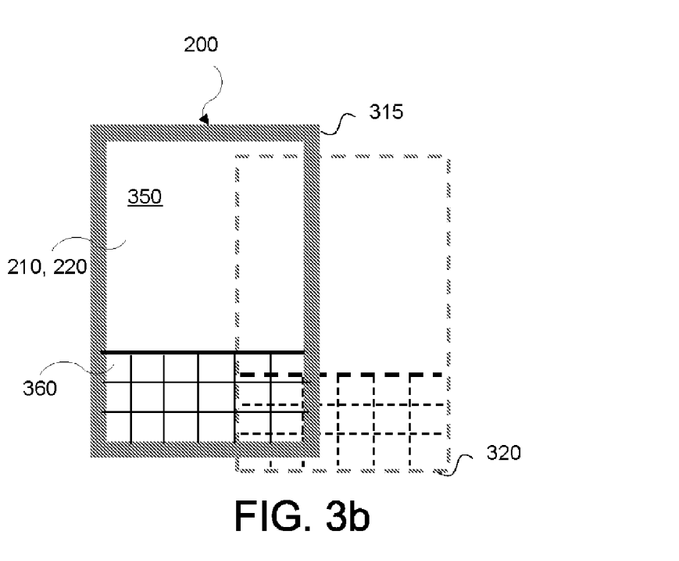

The example of FIG. 3b illustrates a situation where the surface 210 experiences movement during entry of the trace input. In this example the accelerometer 230 is configured to detect the movement of the surface 210 from a first position 315 to a second position 320. In this example the apparatus 200 experiences a shake to the right. In some examples a shake to the right, left, up, down, or any combination thereof may occur. In one example embodiment, the movement in the example of FIG. 3b may be due to external circumstances of the surface 210 and/or apparatus 200 such as due to a user holding the apparatus in a running bus, in a car or holding the device while running or walking, for example. In another example embodiment, the movement may be due to internal circumstances of the surface 210 and/or apparatus 200 such as the operation of a vibrator included in the apparatus 200.

The processor 110 may be configured to receive movement data describing the movement of the surface 210 during entry of the trace input. In the example of FIG. 3, the movement data comprises a description of movement from a first position to a second position. The movement data may comprise, for example, measurement values describing a change in the absolute position of the surface 210 or measurement values describing a change in the relative position of the surface 210. According to one example embodiment, the movement data comprises at least one acceleration measurement.

Figure 3C:
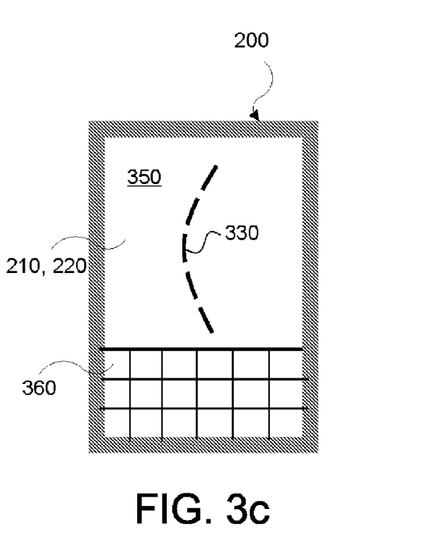

The example of FIG. 3c illustrates a trace 330 actually entered on the touch screen during the movement of the surface 210. The user intended to enter a trace 310 according to the example of FIG. 3a, but due to the external movement, the user failed to enter a trace having a desired shape. In the example of FIG. 3c, the entered trace 330 comprises a curved line instead of the intended straight line due to a shake to the right that occurred during entry of the trace. The trace 330 in FIG. 3c is shown for illustrative purposes and may not be visible to the user.

According to some example embodiments, the processor 110 is configured to modify the trace input 330 based on the movement data. According to one such example embodiment, modifying the trace input comprises compensating the trace input based on the movement data. The processor 110 may be configured to compensate the trace input 330 by an amount relative to the movement data. In some examples, compensating the trace input comprises counterbalancing the effects of the movement of the surface 210 based on the movement data. According to one example embodiment, counterbalancing the effects of the movement of the surface 210 comprises nullifying the effects of the movement of the surface 210 on the trace input 330. According to another example embodiment, counterbalancing the effects of the movement of the surface 210 comprises minimising the effects of the movement of the surface 210 on the trace input 330. According to a further example embodiment, counterbalancing the effects of the movement of the surface 210 comprises producing an equilibrium in relation to the trace input 330.

Figure 3D:
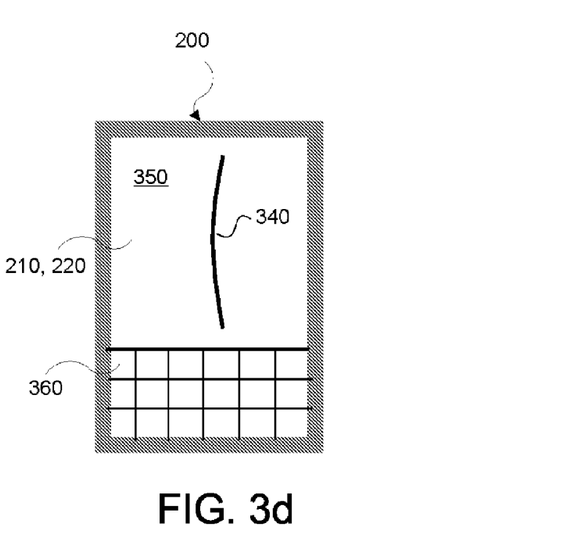

The example of FIG. 3d illustrates a modified trace input 340 received by modifying the trace input 330 based on the movement data. The modified trace input 340 might not be exactly the straight line 310 the user intended to enter, perhaps as a result of inaccuracies in the trace that were not the result of movement of the surface 210 but have other causes—e.g. a tremor in the user's hand, inaccuracies in modifying the trace input and/or inaccuracies in compensating the trace input. The modified trace input 340 may represent an improvement in trace input recognition. It should be noted that in the example of FIG. 3d the modified trace input 340 is shown for illustrative purposes only. However, in some further embodiments the modified trace input 340 may also be visually shown to the user.

In some example embodiments a user may enter several trace inputs at least partially simultaneously and more than one trace inputs may be modified based on the movement data. For example, a user may enter two trace inputs on a touch screen at least partially simultaneously, for example, by means of two fingers, two styluses or one finger and one stylus, and the two trace inputs may be modified based on the movement data. Thus, in some examples, multiple trace inputs entered on a surface may be modified based on the movement data.

The example embodiments such as that illustrated in FIGS. 3a to 3d, enables use of the modified trace input for improving handwriting recognition, character recognition, gesture recognition or any other kind of input recognition. It should be noted that an input recognition may also include additional operations such as converting a signal describing the modified trace input into, for example, letter codes that are usable within computer and/or text-processing applications.

FIGS. 4a to 4d illustrate another example user interface incorporating aspects of the disclosed embodiments. Similarly to FIGS. 3a to 3d, an apparatus 200 comprises a touch screen display incorporated within the user interface 220, which allows inputting and accessing information via the touch screen display. The display is configured to present user interface objects. The example apparatus 200 of FIG. 4 may also comprise one or more keys and/or additional and/or other components.

Figure 4A:
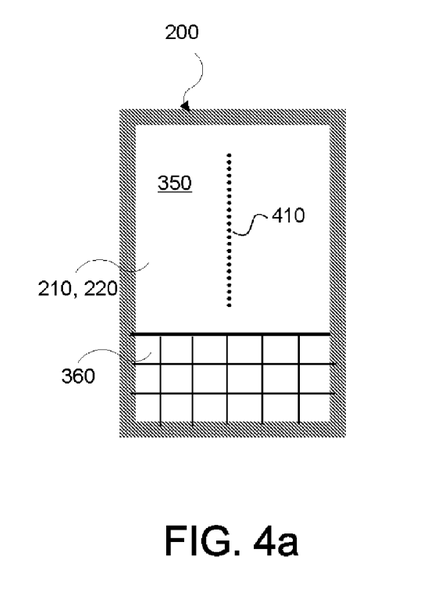
FIGS. 4a to 4d illustrate another user interface in accordance with an example embodiment of the invention.

Similarly to the example of FIG. 3a, in the example of FIG. 4a a user wishes to input a trace on the touch screen as illustrated by the dotted line 410 in FIG. 4a. The processor 110 is configured to receive a trace input on the surface 210.

Figure 4B:
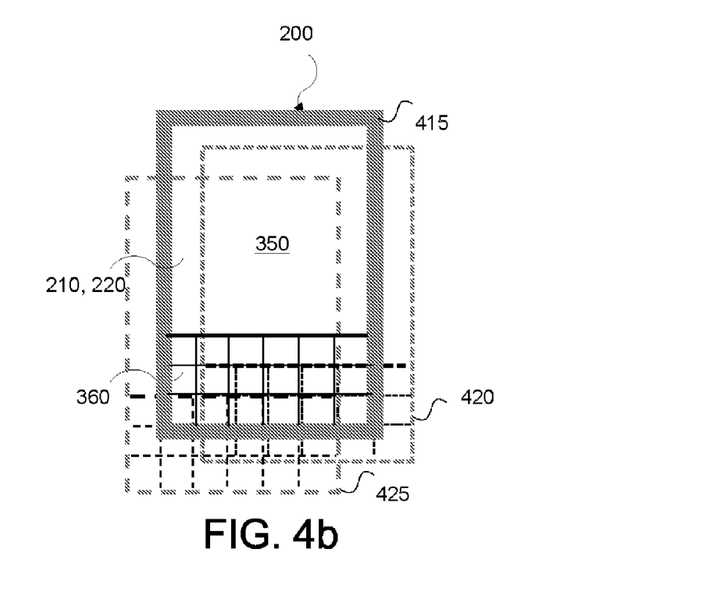

The example of FIG. 4b illustrates that the surface 210 experiences movement during entry of the trace input. The accelerometer 230 is configured to detect the movement of the surface 210 from a first position 415 to a second position 420 and further to a third position 425. In this example, the apparatus moves from the original position to the right and further to the left as illustrated in FIG. 4b. As in the examples of FIGS. 3a to 3d, the movement in the example of FIG. 4b may be due to external or internal circumstances of the surface 210 and/or apparatus 200.

Figures 4C, 4D:
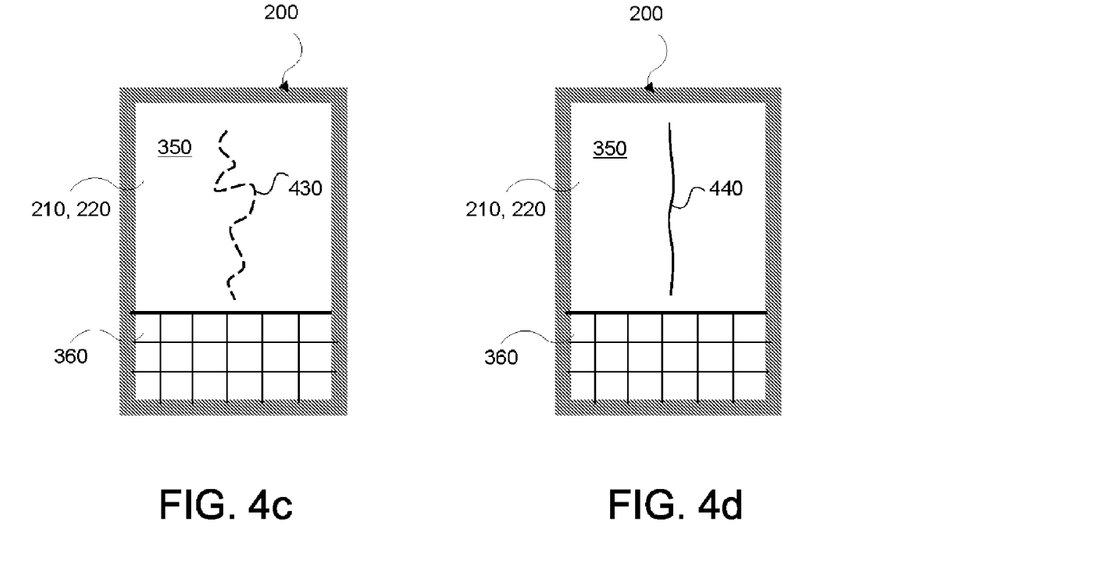

The processor 110 may be configured to receive movement data describing the movement of the surface 210 during entry of the trace input. In the example of FIG. 4, the movement data comprises a description of movement from a first position to a second position and further to a third position.

The example of FIG. 4c illustrates a trace input 430 actually entered on the touch screen. The user intended to enter a trace input 410 according to the example of FIG. 4a, but due to the external movement of the surface 210 during the entry of the trace input as illustrated in FIG. 4b, the user failed to enter a trace input having a desired shape. In the example of FIG. 4c, the entered trace input 430 comprises a winding line instead of an intended straight line due to movement that occurred during the entry of the trace input 430. The trace input 430 in FIG. 4c is shown for illustrative purposes only and may not be visible to the user.

According to an example embodiment, the processor 110 may be configured to modify the trace input 430 based on the movement data. According to one example embodiment, modifying the trace input comprises compensating the trace input based on the movement data. The processor 110 may be configured to compensate the trace input 430 by an amount relative to the movement data. In some examples, compensating the trace input comprises counterbalancing the effects of the movement of the surface 210 based on the movement data. According to one example embodiment, counterbalancing the effects of the movement of the surface 210 comprises nullifying the effects of the movement of the surface 210 on the trace input 430. According to another example embodiment, counterbalancing the effects of the movement of the surface 210 comprises minimising the effects of the movement of the surface 210 on the trace input 430. According to a further example embodiment, counterbalancing the effects of the movement of the surface 210 comprises producing an equilibrium in relation to the trace input 430.

Similarly to the example of FIG. 3d, the example of FIG. 4d illustrates a modified trace input 440 received by modifying the trace input 430 based on the movement data. Even though the modified trace input 440 might not be exactly the straight line 410 the user intended to enter, the modified trace input may in some embodiments improve trace input recognition. Similarly to the example of FIG. 3d the modified trace input 440 is shown for illustrative purposes only. However, in some embodiments the modified trace input 440 may also be visually shown to the user.

Referring to the examples FIGS. 3a to 3d and 4a to 4d, the movement data may comprise an individual shake, a sequence of shakes, random movement, repetitive movement, tremor, movement to a first direction, movement to a first and second direction, or any combination thereof.

According to one example embodiment, movement data comprises movement of the surface 210 between a first point in time and a second point in time. For example, for a trace input 330/430 at T point in time, the measurement data may comprise acceleration measurements at e.g. T-1, T-2, T-3 and T-4 points in time. In other words, for a given point in time, the movement data may comprise multiple acceleration measurements preceding the given point in time. In some examples, the movement data may also comprise an acceleration measurement upon the given point in time. In some examples, the movement data associated with a portion of the trace input 330/430 occurring at a particular point in time comprises multiple acceleration measurements.

In some examples, the movement data may comprise movement data describing the movement of the surface before the entry of the trace input. In some examples, the movement data may comprise movement data describing the movement of the surface after the entry of the trace input. In some examples, the movement data may comprise movement data describing the movement of the surface before and after the entry of the trace input. In some examples, the movement data may comprise movement data describing the movement of the surface during entry of the trace input and movement data describing the movement of the surface before and/or after the entry of the trace input.

According to one example embodiment, the processor 110 may be configured to receive updated measurement data in response to a change in a parameter of the trace input 330/430. The parameter may comprise, for example, a position of the trace input 330/430 or the duration of the trace input 330/430. As an example, the processor 110 may be configured to receive updated measurement data in response to a user entering a trace 330/430 wherein the position of the trace changes from a first position to a second position. A change in a position of the trace input may be defined, for example, based on a number of pixels or a travelled distance. As another example, the processor 110 may be configured to receive updated measurement data in response to a user entering a trace 330/430 wherein an elapsed period of time exceeds a pre-determined threshold value.

In some example embodiments movement data describing the movement of the surface comprises weighted data. According to one example embodiment, a first set of movement data has a first weighting and a second set of movement data has a second weighting. For example, the latest data such as movement data just before and/or upon the entry of the trace input 330/430 may have a greater effect on the entered trace input 330/430 than movement data received long before the entry the trace input 330/430. According to another example embodiment movement data comprising a deviation from a specified norm exceeding a pre-determined threshold value may have a greater effect on the entered trace input 330/430 than movement data within the specified norm.

Figure 5:
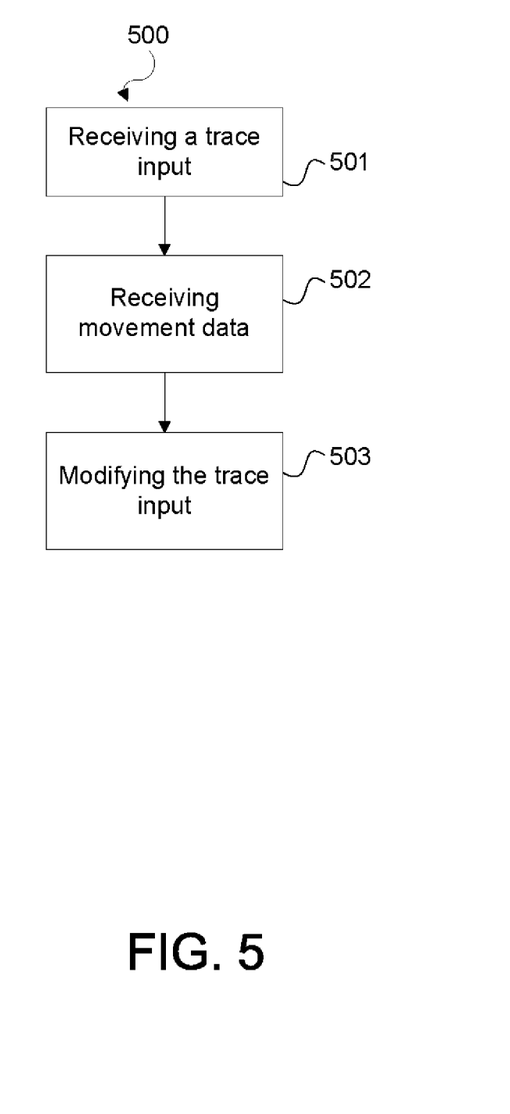
FIG. 5 illustrates an example method incorporating aspects of the disclosed embodiments.

FIG. 5 illustrates an example method 500 incorporating aspects of the previously disclosed embodiments. In a first aspect a trace input entered on a surface 210 is received 501 by a processor 110. According to one example embodiment the surface 210 is a touch screen display. According to another example embodiment the surface 210 is a touch pad. The trace input may be entered by a user by means of a stylus, a digital pen or a finger, for example.

The processor 110 may be configured to receive 502 movement data describing the movement of the surface during entry of the trace input.

The movement data may originate from any means capable of detecting movement such as the accelerometer 230. In some examples the movement data comprises at least one acceleration measurement. The movement data may describe a sudden movement, individual movement, sequential movement or random movement of the surface.

The processor 110 may further be configured to modify 503 the trace input based on the movement data. According to one example embodiment, modifying the trace input comprises compensating the trace input based on the movement data. In some examples, compensating the trace input comprises counterbalancing the effects of the movement of the surface 210 based on the movement data. According to one example embodiment, counterbalancing the effects of the movement of the surface 210 comprises nullifying the effects of the movement of the surface 210 on the trace input 430. According to another example embodiment, counterbalancing the effects of the movement of the surface 210 comprises minimising the effects of the movement of the surface 210 on the trace input 430. According to a further example embodiment, counterbalancing the effects of the movement of the surface 210 comprises producing an equilibrium in relation to the trace input 430.

In an example embodiment modifying the trace input comprises compensating the trace input by an amount relative to the movement data. In some examples the amount may be equal to the detected movement. For example, if the trace input experiences a sudden shake to the left by five pixels, modifying the trace input may include compensating the trace input by five pixels to the right. In some examples the amount may be a percentage value. For example, if the trace input experiences a sudden shake to the left by five pixels, modifying the trace input may include compensating the trace input by 80 percent of the five pixels. In some examples modifying the trace input may comprise linearly compensating the trace input. In some examples modifying the trace input may comprise non-linearly compensating the trace input. For example, modifying the trace input may be based on a logarithmic scale.

In some example embodiments movement data describing the movement of the surface comprises weighted data. According to one example embodiment, a first set of movement data has a first weighting and a second set of movement data has a second weighting. For example, the latest data such as movement data just before and/or upon the entry of the trace input 330/430 may have a greater effect on the entered trace input 330/430 than movement data received long before the entry the trace input 330/430. According to another example embodiment movement data comprising a deviation from a specified norm exceeding a pre-determined threshold value may have a greater effect on the entered trace input 330/430 than movement data within the specified norm.

According to one example embodiment the received movement data may be updated in response to a change in a parameter of the trace input. The parameter may comprise, for example, a position of the trace input 330/430 or the duration of the trace input 330/430. As an example, the processor 110 may be configured to receive updated measurement data in response to a user entering a trace 330/430 wherein the position of the trace changes from a first position to a second position. A change in a position of the trace input may be defined, for example, based on a number of pixels or a travelled distance. As another example, the processor 110 may be configured to receive updated measurement data in response to an entry of a trace 330/430 wherein an elapsed period of time exceeds a pre-determined threshold value.

According to some example embodiments the modified trace input 340/440 may be used for handwriting recognition.

Without in any way limiting the scope, interpretation, or application of the claims appearing below, a technical effect of one or more of the example embodiments disclosed herein is improving handwriting recognition in terms of improved accuracy of input characters. Another technical effect of one or more of the example embodiments disclosed herein is that a user does not necessarily need to re-enter a trace input due to a shaking environment, but the current circumstances can automatically be taken into account. Another technical effect of one or more of the example embodiments disclosed herein is enabling a dynamic correction of a trace input.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:

receiving a trace input entered on a surface;

receiving movement data describing the movement of the surface during entry of the trace input; and modifying the trace input by compensating the trace input by an amount relative to the movement of the surface to counterbalance effects of the movement of the surface and produce an equilibrium in relation to the trace input to offset the movement, wherein modifying the trace input comprises modifying the trace input by offsetting a number of pixels in a manner corresponding to the movement of the surface.

2. The method according to claim 1, wherein the movement data is associated with a portion of the trace input occurring at a particular point in time comprises multiple acceleration measurements.

3. A method according to claim 1, further comprising receiving updated movement data in response to a change in a parameter of the trace input.

4. A method according to claim 3, wherein the parameter of the trace input comprises a position of the trace input or duration of the trace input.

5. A method according to claim 1, wherein the movement data comprises at least one acceleration measurement.

6. A method according to claim 1, further comprising using the modified trace input for handwriting recognition.

7. An apparatus, comprising:

a processor, memory including computer program code, the memory and the computer program code configured to, working with the processor, cause the apparatus to perform at least the following:

to receive a trace input entered on a surface;

to receive movement data describing the movement of the surface during entry of the trace input; and to modify the trace input by compensating the trace input by an amount relative to the movement of the surface to counterbalance effects of the movement of the surface and produce an equilibrium in relation to the trace input to offset the movement, wherein modifying the trace input comprises modifying the trace input by offsetting a number of pixels in a manner corresponding to the movement of the surface.

8. An apparatus according to claim 7, wherein the movement data associated with a portion of the trace input occurring at a particular point in time comprises multiple acceleration measurements.

9. An apparatus according to claim 7, wherein the processor is further configured to receive updated movement data in response to a change in a parameter of the trace input.

10. An apparatus according to claim 9, wherein the parameter of the trace input comprises a position of the trace input or duration of the trace input.

11. An apparatus according to claim 7, wherein the movement data comprises at least one acceleration measurement.

12. An apparatus according to claim 7, wherein the processor is further configured to use the modified trace input by handwriting recognition.

13. A computer program product comprising a computer-readable medium bearing computer program code embodied therein for use with a computer, the computer program code comprising:

code for receiving a trace input entered on a surface;

code for receiving movement data describing the movement of the surface during entry of the trace input; and code for modifying the trace input by compensating the trace input by an amount relative to the movement of the surface to counterbalance effects of the movement of the surface and produce an equilibrium in relation to the trace input to offset the movement, wherein modifying the trace input comprises modifying the trace input by offset a number of pixels in a manner corresponding to the movement of the surface.

14. A computer program product according to claim 13, further comprising code for receiving updated movement data in response to a change in a parameter of the trace input.

15. A computer program product according to claim 13, further comprising code for using the modified trace input for handwriting recognition.

* * * * *

UNITED STATES PATENT AND TRADEMARK OFFICE
CERTIFICATE OF CORRECTION

PATENT NO. : 9,710,155 B2  
APPLICATION NO. : 13/991801  
DATED : July 18, 2017  
INVENTOR(S) : Zou et al.

Page 1 of 1

It is certified that error appears in the above-identified patent and that said Letters Patent is hereby corrected as shown below:

In the Claims

Column 11,  
Line 16, Claim 2 "time" should read --time and--.  
Line 29, Claim 7 "processor," should read --processor, and--.

Column 12,  
Line 5, Claim 8 "data" should read --data is--.  
Line 6, Claim 8 "time" should read --time and--.  
Line 19, Claim 12 "by" should read --for--.  
Line 33, Claim 13 "offset" should read --offsetting--.

Signed and Sealed this  
Sixth Day of March, 2018

Andrei Iancu  
*Director of the United States Patent and Trademark Office*